United States Patent
Longoni

(10) Patent No.: US 6,968,192 B2
(45) Date of Patent: Nov. 22, 2005

(54) CELL LOAD CONTROL METHOD AND SYSTEM

(75) Inventor: Fabio Longoni, Espoo (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 09/876,562

(22) Filed: Jun. 7, 2001

(65) Prior Publication Data

US 2002/0052206 A1 May 2, 2002

Related U.S. Application Data

(63) Continuation of application No. PCT/EP98/07932, filed on Dec. 7, 1998.

(51) Int. Cl.[7] .................................................. H04Q 7/20
(52) U.S. Cl. ........................ 455/453; 455/436; 455/438; 455/446
(58) Field of Search ................................ 455/453, 452, 455/446, 553.1, 434, 403, 424, 436–439

(56) References Cited

U.S. PATENT DOCUMENTS

| | | | | |
|---|---|---|---|---|
| 4,670,899 A | * | 6/1987 | Brody et al. ................. | 455/453 |
| 6,215,776 B1 | * | 4/2001 | Chao .......................... | 370/316 |
| 6,233,222 B1 | * | 5/2001 | Wallentin .................... | 370/229 |
| 6,292,667 B1 | * | 9/2001 | Wallentin et al. ............ | 455/458 |
| 6,339,705 B1 | * | 1/2002 | Pehrson ...................... | 455/419 |
| 6,363,252 B1 | * | 3/2002 | Hamalainen et al. ........ | 455/436 |
| 6,385,449 B2 | * | 5/2002 | Eriksson et al. ............. | 455/436 |
| 6,445,924 B1 | * | 9/2002 | Rasanen ...................... | 455/437 |
| 6,473,399 B1 | * | 10/2002 | Johansson et al. ........... | 370/229 |
| 6,490,452 B1 | * | 12/2002 | Boscovic et al. ............ | 455/436 |
| 6,574,473 B2 | * | 6/2003 | Rinne et al. ................. | 455/436 |
| 2001/0053695 A1 | * | 12/2001 | Wallentin .................... | 455/436 |

FOREIGN PATENT DOCUMENTS

| | | |
|---|---|---|
| WO | WO 97/41698 | 11/1997 |
| WO | WO 98/48530 | 10/1998 |

* cited by examiner

*Primary Examiner*—Cong Van Tran
(74) *Attorney, Agent, or Firm*—Squire, Sanders & Dempsey L.L.P.

(57) ABSTRACT

A method and system for performing cell load control in a mobile radio network using diversity connections between base stations is described, wherein the efficiency of the resource management in the radio network is improved by transmitting an external message containing a load information of a cell to a radio network controller not serving this cell. The transmission may be performed in response to a corresponding request transmitted by the radio network controller to another radio network controller which serves the corresponding radio cell. When the radio network controller has received the load information of the cell controlled by the other radio network controller, it may use the load information for deciding on a load status of the radio cell. Thereby, the resource management of radio network is more efficient and the load is maintained balanced among different cells, wherein a possible situation of cell congestion and high interference is avoided. Moreover, the active set management efficiency is improved, resulting in a higher connection quality, since the decision algorithm to change the active set is faster and more efficient.

27 Claims, 3 Drawing Sheets

CELL LOAD CONTROL METHOD AND SYSTEM

This is a continuation of application Ser. No. PCT/EP98/07932, filed Dec. 7, 1998.

FIELD OF THE INVENTION

The present invention relates to a method and system for performing cell load control in a mobile radio network using diversity connections between base stations, such as a radio access network of a WCDMA (Wideband Code Division Multiple Access) system like the UTMS (Universal Mobile Telecommunications System).

BACKGROUND OF THE INVENTION

In a radio access network of a WCDMA system, a soft handover is an essential feature which, allows an efficient use of the capacity which can be offered by network. In a soft handover state, one mobile station (MS) is connected using a plurality of radio cells contained in its active set (AS) as a resource. The MS monitors levels of received signals broadcasted from neighboring base stations, compares them to a set of thresholds, and reports the measurement of neighbor cells to a radio network controller (RNC) controlling this specific MS, i.e. a Serving RNC (SRNC), and, using this information, the SRNC may transmit a command to the MS to add a new radio cell to its active set, delete a radio cell, replace one or more radio cells, perform an interfrequency handover, and so on. The active set is defined as a set of base stations from which the same user information is sent, simultaneously demodulated and coherently combined.

However, a problem arises when the new or "candidate" cell to be added to the active set is not controlled by the SRNC (such a cell is referred to as "drift cell"), because the load or congestion status of that cell is not available at the SRNC.

Another problem arises when the drift cell is already in the active set, i.e. radio cells which are actively used in the present connection of the MS (inter RCN soft handover). Also in this case, the load status of the drift cell is not known to the SRNC and cannot be considered when the SRNC decides on the execution of a handover, i.e. a handover for traffic reasons is not possible.

A simple solution to the above problems is that the SRNC ignores the load status of the drift cell, and the load status is not used in the decision to add this drift cell to the respective set of the MS. In contrast thereto, the load status of the cells controlled by the SRNC is available and can be used by a handover algorithm performed in the SRNC. When the SRNC decides to add the drift cell to the active set solely on the basis of the measurement report, it transmits a dedicated message (branch addition request) to the so-called Drift RNC (DRNC) controlling the drift cell, wherein the DRNC decides whether to accept or reject the addition of the new cell on the basis of the cell load status (admission control procedure).

However, the load of the drift cell cannot be checked by the SRNC, even if the cell is in the active set of the MS controlled by the SRNC Thus, the radio resource management (RRM) algorithm such as a handover control algorithm of the SRNC cannot be used in an efficient manner, because the load of the drift cell is not known. This leads to the following specific problems:

1) The SRNC may decide to add the drift cell to the active set even if the load of the cell is high and some other radio cells of less load could have been selected. Accordingly, the SRNC sends a branch addition message to the DRNC which may accept the new cell, wherein the increased load of the accepted radio cell may cause an increased interference such that the distribution of the load in the network is not balanced. Otherwise, the DRNC may refuse the new radio cell (branch), wherein the SRNC decides on the following step in accordance with its control algorithms, which causes a delay due to the external signaling between the SRNC and the DRNC. In a worst case scenario, the SRNC may try a view moments later to add the same radio cell to the active set to another or even the same MS.

2) The load of a drift cell already included in the active set of the MS may increase. Since the drift cell is not controlled by the SRNC, the SRNC is not aware of the load increase, which may lead to an unbalanced network. Moreover, the load of the cell may increase to such an extend that the cell reaches a congestion state, and the branch is lost or deleted by the DRNC. Thereby, the quality of the connection may decrease.

3) The SRNC may request to add a drift cell which is not available due to a congestion Status or a hardware failure to the active set of the controlled MS. Again, this might lead to a decrease in the quality of the connection.

SUMMARY OF THE INVENTION

It is therefore an object of the present invention to provide a method and system for performing a cell load control, which enable a more efficient use of the radio resource algorithms and thus of the system capacity.

This object is achieved by a method for performing cell load control in a mobile radio network using diversity connections between base stations, comprising the steps of:

transmitting a load information of a radio cell from a first radio network controller serving a radio cell to a second radio network controller not serving the radio cell; and using the load information in the second radio network controller for deciding on a load status of the radio cell.

Additionally, the above object is achieved by a system for performing a cell load control in a mobile radio network using diversity connections between base stations, comprising:

a first radio network controller comprising transmitting means arranged for transmitting a load information of a radio cell served by the first radio network controller to a second radio network controller not serving the radio cell; and the second radio network controller comprising a receiving means arranged for receiving the load information, and a decision means arranged for deciding on a load status of the radio cell.

Accordingly, since the second radio network controller thus knows the load status or condition of the drift cell controlled by the first radio network controller, it can use its radio resource algorithms in a more effective way.

The decision on the load status of the radio cell can be used for deciding on an admission of the radio cell for handover of a mobile terminal controlled by the second radio network controller. Thus, the second radio network controller may refer to the received load information, in case an admission decision concerning a drift cell has to be made. The admission control is then able to check whether the drift cell has sufficient resources to accept a new branch.

Thereby, the system capacity can be used more efficiently and the active set management and thus the overall quality of the connections are improved.

Since the benefits of the present invention depend on the probability to have a drift cell contained in the active set of a MS, the advantage achieved by the present invention is high in case of small controlling areas of the radio network controller, or in case the SRNC relocation is never triggered (anchor RNC concept) or rarely triggered.

Moreover, a high advantage can be achieved, if the radio network is planned in such a way that radio cells controlled by different radio network controllers are mixed together in the same area, which may be the case when an operator decides to expand the network using equipment from another vendors i.e. multivendor scenario without an open interface.

Preferably, the load information is transmitted in response to a load request issued by the second radio network controller Thus, the second radio network controller may issue a load request, in case a drift cell is included in the active set of a controlled MS. Thereby, the signaling load due to the transmission of the load information can be restricted to those cases where the load information is actually required by the SRNC.

Furthermore, the load information can be transmitted when a load level of the radio cell has reached a predetermined load threshold. Thereby, an addition of a congested cell to the active set of the MS can be prevented, since the SRNC is informed by the transmitted load information. In this case, the second radio network controller may command a controlled MS to replace or delete a branch to the congested radio cell, in response to the load information. Thus, the loss of a branch due to the use of a congested radio cell can be prevented.

Furthermore, the second radio network controller may issue the load request on the basis of a measurement of neighbor cells reported by the mobile terminal. Thus, the second radio network controller may issue the load request only for potential candidate cells to be added to the active set of the mobile terminal.

Moreover, the load request may be issued when the radio cell is included in an active set or a candidate set of the mobile terminal, wherein the active set or the candidate set is used for determining radio cells for the handover of the mobile terminal.

Additionally, the load request may be issued when the mobile terminal has transmitted a request to the second radio network controller to add the radio cell to the active set. Thereby, the second radio network controller may check the received load information before deciding on the admission of the drift cell.

Preferably, a periodical load information may be requested by the load request. By means of the periodical load report, the second radio network controller may monitor the load status of a drift cell included in the active set of the mobile terminal, such that the signaling load due to continued load requests can be reduced.

Preferably, the load information includes a transmission power level and a received interference level of the radio cell. Accordingly, the second radio network controller may compare the receive transmission power level and interference level with a ma transmission power level and a maximum reception interference level to thereby evaluate the load status of the drift cell.

The first radio network controller may comprise a determination means for determining a load level of the radio cell and for generating the load information. Preferably, the determination means controls the transmitting means so as to transmit the load information, when the load level of the radio cell has reached the predetermined load threshold.

Furthermore, the first radio network controller may comprise a receiving means for receiving a load request transmitted by a transmitting means of the second radio network controller, wherein the determination means is arranged to control the transmitting means of the first radio network controller to transmit the controlled information, when the load request has been received by the receiving means.

Furthermore, the determination means may be arranged to periodically determine the load information and to control the transmitting means of the first radio network controller to periodically transmit the load information.

Preferably, the determination means is arranged to determine the load information on the basis of a load parameter received by the first radio network controller from a base station of the radio cell.

As an alternative, the load status can be used for deciding on an amount of capacity which can be allocated to a user.

As a further alternative, the load status can be used for deciding when to order a mobile terminal to switch to a dedicated channel state in this case, the mobile terminal may be ordered to switch to said dedicated channel, when the load status indicates an overload of a common channel.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
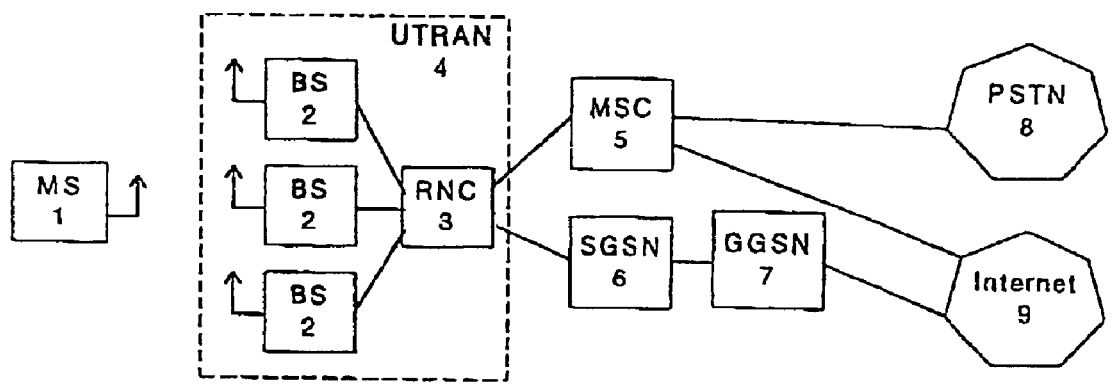
FIG. 1 shows a principle block diagram of a radio access network of the UMTS, in which the preferred embodiment of the present invention may be implemented.

In the following, the preferred embodiment of the method and system according to the present invention will be described on the basis of a radio access system of the UMTS, as shown in FIG. 1.

According to FIG. 1, a UTRAN 4 is connected to a GPRS-based core network and to a GSM-based core network. Furthermore, a mobile station (MS) 1 is radio-connected to at least one base station (BS) 2 which is connected to a radio network controller (RNC) 3 of the UTRAN 4. In WCDMA-based systems, the MS 1 can be connected to several BS 2 simultaneously due to macrodiversity.

The RNC 3 is connected to a mobile switching center (MSC) 5 of the UNTS which provides access to a circuit switched network such as a public switched telephone network (PSTN) 8 or to a packet-switched network such as the Internet 9.

Additionally, the RNC 3 is connected to a Serving GPRS Support Node (SGSN) 6 of the UMTS. The SGSN 6 is connected to a Gateway GPRS Support Node (GGSN) 7 which provides access to the Internet 9.

The RNC 3 performs radio network control functions such as a connection establishment and release, handover, power control and radio resource handling functions. Diversity combining devices used at soft handover, and a code function are also located in the RNC 3.

The RNC 3 may be built on a generic ATM switch, wherein all devices and a processor are connected to the ATM switch. In the present case, several BS 2 are connected to the RNC 3.

Figure 2:
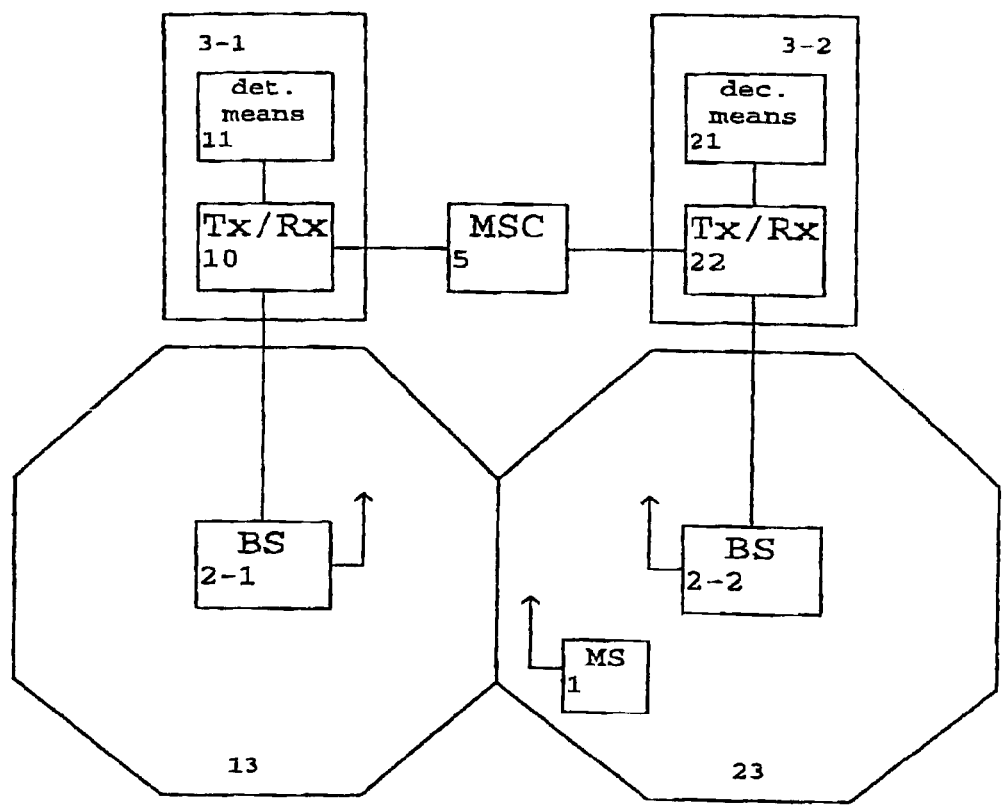
FIG. 2 shows a principle block diagram of a radio access network in which two adjacent radio cells are served by a cell load control system according to the preferred embodiment of the present invention.

FIG. 2 shows a principle block diagram comprising a first RNC 3-1 and a second RNC 3-2, which serve adjacent radio cells 13 and 23, respectively. The first RNC 3-1 is connected via the MSC 5 to the second RNC 3-2, wherein the second RNC 3-2 serves the corresponding radio cell 23 via a base station (BS) 2-2. Furthermore, the first RNC 3-1 serves the corresponding radio cell 13 via another BS 2-1.

It is noted that the first and second RNC 3-1, 3-2 are also connected to other BSs (not shown) so as to serve a plurality of respective radio cells.

In the case shown in FIG. 2, a mobile station (MS) 1 is located in the radio cell 23 controlled by the BS 2-2 connected to the second RNC 3-2. Thus, the MS 1 is located in the service area of the second RNC 3-2, such that the second RNC 3-2 is the SRNC of the MS 1.

According to the preferred embodiment, the second RNC 3-2 comprises a transceiver 22 for transmitting a request to the first RNC 3-1 to transmit a load information of the radio cell 13 controlled by the first RNC 3-1. Transmissions between the first RNC 3-1 and the second RNC 3-2 are performed via the MSC 5.

In particular, the second RNC 3-2 may request to transmit the load information only once, or to transmit a periodical report, i.e. the load information is transmitted every predetermined number of seconds. Moreover, the load information can be transmitted, when the first RNC 3-1 determines a considerable change of the load of the controlled radio cell 13, e.g. when a critical threshold is reached.

Furthermore, the second RNC 3-2 may request the load information in case the MS 1 has the radio cell 13, which is controlled by the first RNC 3-1, in its active or candidate set used for a soft handover, or simply because the radio cell 13 controlled by the first RNC 3-1 is a neighbor to the serving area of the second RNC 3-2 and most likely to be added to the active set of the MS 1.

The first RNC 3-1 comprises a transceiver 10 arranged for transmitting the load information message to the second RNC 3-2 in response to the receipt of the load request from the second RNC 3-2.

The load information message contains load parameters of one (or more) of the radio cells served by the first RNC 3-1. Such load parameters may comprise a transmission power level and a received interference level obtained from the BS 2-1 connected to the first RNC 3-1. Moreover, the load parameters may comprise a maximum transmission power and a maximum acceptable reception interference level used to determine the load status of the corresponding radio cell 13. Alternatively, the maximum transmission power and the maximum acceptable reception interference level might be stored in each RNC such that it does not have to be included in the load information message.

The first RNC 3-1 comprises a determination means 11 which could be a CPU or the like and which determines a load level of the controlled radio cell 13 based on an information received from the corresponding BS 2-1, and generates the load information message to be supplied to the transceiver 10. Subsequently, the determination Deans 11 controls the transceiver 10 so as to transmit the load information message via the MSC 5 to the second BNC 3-2.

Furthermore, the first RNC 3-1 may transmit the load information message concerning its controlled radio cell 13 to the second RNC 3-2 without any load request from the second RN 3-2. This could be the case, if the cell served by the first RNC 3-2 is in congestion and cannot accept any new branch. Then, the second RNC 3-2 may transmit a command to an MS having this radio cell 13 on its active or candidate set to replace or delete that branch.

The load information about the load of the radio cell 13 controlled by the first RNC 3-1 is supplied to a decision means 21 of the second RNC 3-2. The decision means 21 may be a CPU or the like, and uses the received load information for making a decision as to the admission or deletion of the corresponding radio cell 13 in the active set, of the Ms 1 controlled by the second RNC 3-2.

Figure 3:
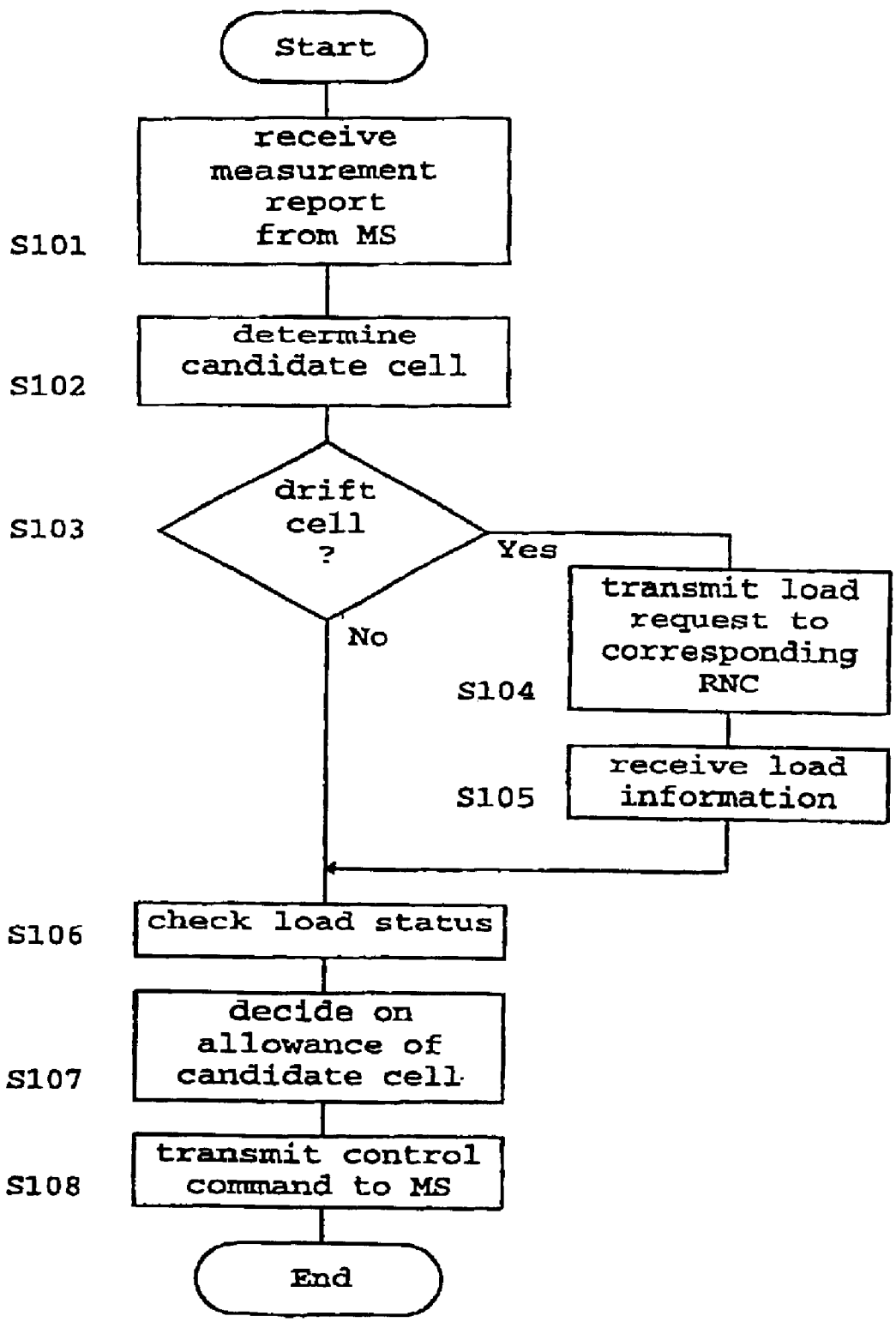
FIG. 3 shows a flow diagram of cell load control procedure according to the preferred embodiment of the present invention.

FIG. 3 shows a cell load control procedure performed in the second RNC 3-2, according to the preferred embodiment of the present invention.

According to FIG. 3, the second RNC 3-2 receives a measurement report from the MS 1 via the transceiver 22 (step S101). The received measurement report is supplied to the decision means 21 which determines a candidate cell which might be added to the active set of the MS 1, on the basis of the measurement report (step S102).

Thereafter, the decision means 21 checks whether or not the determined candidate cell is a drift cell (step S103), i.e. a radio cell not served by the second RNC 3-2.

In case the determined candidate cell is not a drift cell, the procedure is continued at step S106, since the load information of the candidate cell is already available at the second RNC 3-2.

In case the determined candidate cell is a drift cell, the decision means 21 controls the transceiver 22 so as to transmit a load request message via the MSC 5 to the transceiver 10 of the first RNC 3-1 (step S104). Then, the second RNC 3-2 waits for the receipt of the load information of the drift cell from the first RNC 3-1.

After the receipt of the load information, the procedure continues at step S106. In step S106, the load status of the candidate cell is checked in the decision means 21. Based on the load status of the candidate cell, the allowance of the candidate cell to be added to the active set of the MS 1 is decided by the decision means 21 (step S107).

Finally, a control command is generated by the decision means 21 based on the decision result and the decision means 21 subsequently controls the transceiver 22 to transmit the control command to the MS 1 (step S108). The control command is a command for the admission or deletion of the candidate cell in the active set of the MS 1.

In addition to the above procedure according to FIG. 3, a control procedure may be provided so as to transmit a control command to the MS 1 to replace or delete a specific branch from the active set, in case a load information indicating a predetermined load threshold or congestion of the branch has been received from the first RNC 3-1 or another RNC without a corresponding request from the second RNC 3-2 Moreover, a dedicated signaling from the DRNC serving a drift cell may be performed to thereby request a removal or modification of branches for load reasons.

However, the cell load control method and system according to the present invention may as well be applied to the following other radio resource allocation cases which differ from the above described handover case.

For example, in case of packet scheduling, an uplink and/or downlink capacity is allocated for a short time period to an NRT (Non-Real Time) data transmission. Therefore, the second RNC 3-2, i.e. the SRNC, needs to know whether and how much capacity can be provided by a drift cell. This load information can be transmitted in the above described manner from the first RNC 3-1 to the second RNC 3-2 which subsequently decides on the load status of the drift cell 13 and allocates the provided capacity to a requesting user, i.e. a user having transmission data in a corresponding buffer. Thus, the difference with respect to the above handover case lies in the additional determination of the capacity amount to be allocated to the requesting user.

An additional example is a common channel (CCH) load control In this case, the second RNC 3-2 needs to know the load of a common channel, i.e Random Access channel RACH, Fast Associated channel FACH or Downlink shared channel DSCH, in the drift cell 13, in order to determine when to order the MS 1 to switch to a dedicated channel (DCH) state due to a load status indicating an overload of the respective common channels.

It is to be pointed out that the cell load control method and system described in the preferred embodiment can be applied in any WCDMA radio access network and basically in all radio networks using diversity connections between base stations controlled by different controllers. The above description of the preferred embodiment and the accompanying drawings are only intended to illustrate the present invention. The preferred embodiment of the invention may thus vary within the scope of the attached claims.

In summary, a method and system for performing cell load control in a mobile radio network using diversity connections between base stations is described, wherein the efficiency of the resource management in the radio network is improved by transmitting an external message containing a load information of a cell to a radio network controller not serving this cell. The transmission may be performed in response to a corresponding request transmitted by the radio network controller to another radio network controller which serves the corresponding radio cell. When the radio network controller has received the load information of the cell controlled by the other radio network controller, it may use the load information for deciding on a load status of the radio cell. Thereby, the resource management of radio network is more efficient and the load is maintained balanced Song different cells, wherein a possible situation of cell congestion and high interference is avoided. Moreover, the active set management efficiency is improved, resulting in a higher connection quality, since the decision algorithm to change the active set is faster and more efficient.

What is claimed is:

1. A method for performing cell load control in a mobile radio network using diversity connections between base stations, comprising the steps of:
   a) transmitting a load information of a radio cell from a first radio access network controller serving said radio cell to a second radio access network controller not serving said radio cell, wherein said load information is transmitted in response to a load request issued by said second radio access network controller; and
   b) using said load information in said second radio access network controller for deciding on a load status of said radio cell.

2. A method according to claim 1, wherein said load status is used for deciding on an admission of said radio cell for handover of a mobile terminal controlled by the second radio access network controller.

3. A method according to claim 1, wherein said load information is transmitted, when a load level of said radio cell has reached a predetermined load threshold.

4. A method according to claim 3, wherein said second radio access network controller commands a controlled mobile terminal to replace or delete a branch to said second cell, in response to said load information.

5. A method according to claim 2, wherein said load request is issued on the basis of a measurement of a neighbor cell supported by said mobile terminal.

6. A method according to claim 2, wherein said load request is issued, when said radio cell is included in an active set or a candidate set of said mobile terminal, said active set or candidate set being used for determining radio cells for the handover of said mobile terminal.

7. A method according to claim 6, wherein said load request is issued, when said mobile terminal has transmitted a request to said second radio access network controller to add said radio cell to said active set.

8. A method according to claim 6, wherein said admission decision is directed to an admission or deletion of said radio cell in the active set of said mobile terminal.

9. A method according to claim 1, wherein a periodical load information is transmitted in response to said load request.

10. A method according to claim 1, wherein said radio cell is located adjacent to an area served by said second radio access network controller.

11. A method according to claim 1, wherein said load information includes a transmission power level and a received interference level of said radio cell.

12. A method according to claim 1, wherein said mobile radio network is a radio access network of the UMTS.

13. A method according to claim 1, wherein said load status is used for deciding on an amount of capacity which can be allocated to a user.

14. A method according to claim 1, wherein said load status is used for deciding when to order a mobile terminal to switch to a dedicated channel state.

15. A method according to claim 14, wherein said mobile terminal is ordered to switch to said dedicated channel, when said load status indicates an overload of a common channel.

16. A system for performing cell load control in a mobile radio network using diversity connections between base stations, comprising:
   a) a first radio access network controller comprising transmitting means arranged for transmitting a load information of a radio cell served by said first radio access network controller to a second radio access network controller not serving said radio cell, wherein said load information is transmitted in response to a load request issued by said second radio access network controller; and
   b) said second radio access network controller comprising a receiving means arranged for receiving said load information, and a decision means arranged for deciding on a load status of said radio cell.

17. A system according to claim 16, wherein said load status is used for deciding on an admission of said radio cell for a handover of a mobile terminal controlled by said second radio access network controller.

18. A system according to claim 16, wherein said first radio access network controller comprises a determination means for determining a load level of said radio cell and for generating said load information.

19. A system according to claim 18, wherein said determination means controls said transmitting means so as to transmit said load information, when the load level of said radio cell has reached a predetermined load threshold.

20. A system according to claim 18, wherein said first radio access network controller comprises a receiving means for receiving said load request transmitted by a transmitting means of said second radio access network controller, wherein said determination means is arranged to control said transmitting means of said first radio access network controller to transmit said load information when said load request has been received by said receiving means.

21. A system according to claim 20, wherein said determination means is arranged to periodically determine said load information and to control said transmitting means of said first radio access network controller to periodically transmit said load information.

22. A system according to claim 18, wherein said determination means is arranged to determine said load information on the basis of a load parameter received by said first radio access network controller from a base station of said radio cell.

23. A system according to claim 16, wherein said mobile radio network is a radio access network of the UMTS.

24. A system according to claim 16, wherein said load status is used for deciding on an amount of capacity which can be allocated to a user.

25. A system according to claim 16, wherein said load status is used for deciding when to order a mobile terminal controlled by said second radio access network controller to switch to a dedicated channel state.

26. A system according to claim 25, wherein said mobile terminal is ordered to switch to said dedicated channel, when said load status indicates an overload of a common channel.

27. A radio network controller used as said first or second radio access network controller in a system according to claim 16.

* * * * *